United States Patent [19]

Loew et al.

[11] 4,288,589
[45] Sep. 8, 1981

[54] CATIONIC DYES

[75] Inventors: Peter Loew, Münchenstein; Rudolf Zink, Therwil, both of Switzerland

[73] Assignee: Ciba-Geigy Corporation, Ardsley, N.Y.

[21] Appl. No.: 50,247

[22] Filed: Jun. 20, 1979

[30] Foreign Application Priority Data

Jun. 30, 1978 [CH] Switzerland .......................... 7165/78

[51] Int. Cl.³ .......................................... C07D 413/06
[52] U.S. Cl. ..................................... 542/466; 542/401
[58] Field of Search ......................................... 542/466

[56] References Cited

U.S. PATENT DOCUMENTS

| | | | |
|---|---|---|---|
| 3,514,453 | 5/1970 | Spatz et al. | 542/466 |
| 3,597,424 | 8/1971 | Hunter | 542/466 |
| 3,758,466 | 9/1973 | Fisher et al. | 542/466 |
| 3,853,859 | 12/1974 | Hunter | 542/466 |
| 3,855,209 | 12/1974 | Hoyle | 542/466 |
| 3,975,379 | 8/1976 | Schmitt | 542/466 |

Primary Examiner—Arthur P. Demers
Attorney, Agent, or Firm—Edward McC. Roberts; John P. Spitals

[57] ABSTRACT

There are described novel greenish-yellow cationic dyes of the formula

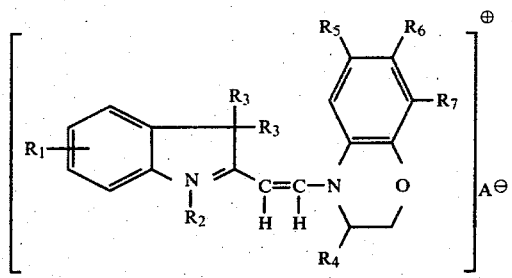

wherein
$R_1$ is hydrogen, halogen, lower alkyl, lower alkoxy or $NO_2$,
$R_2$ is unsubstituted lower alkyl, or lower alkyl which is substituted by: hydroxyl, lower alkoxy, halogen, CN, carboxylic acid amide, carboxylic acid alkyl ester or phenyl, or $R_2$ is alkenyl ($C_3$–$C_4$), the
$R_3$'s independently of one another are each lower alkyl, or both $R_3$'s together form a carbocyclic 5-, 6- or 7-membered ring,
$R_4$ is hydrogen, lower alkyl, unsubstituted aryl or substituted aryl,
$R_5$, $R_6$ and $R_7$ independently of one another are hydrogen, lower alkyl, lower alkoxy, halogen, $NO_2$, CN or lower alkylsulfonyl, and
A is an anion;
processes for producing them, and their use for dyeing and printing textile materials, particularly polyacrylonitrile materials.

23 Claims, No Drawings

CATIONIC DYES

The invention relates to novel cationic dyes, to processes for producing them, and to their use for dyeing and printing materials, particularly textile materials, dyeable with cationic dyes.

Novel cationic dyes have been found which correspond to the general formula I

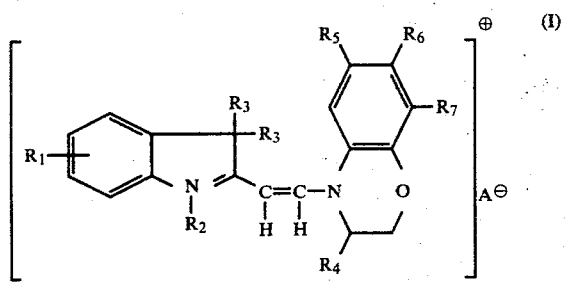

wherein
$R_1$ is hydrogen, halogen, lower alkyl, lower alkoxy or $NO_2$,
$R_2$ is unsubstituted lower alkyl, or lower alkyl which is substituted by: hydroxyl, lower alkoxy, halogen, CN, carboxylic acid amide, carboxylic acid alkyl ester or phenyl, or $R_2$ is alkenyl ($C_3$-$C_4$), the
$R_3$'s independently of one another are each lower alkyl, or both $R_3$'s together form a carbocyclic 5-, 6- or 7-membered ring,
$R_4$ is hydrogen, lower alkyl, unsubstituted aryl or substituted aryl,
$R_5$, $R_6$ and $R_7$ independently of one another are hydrogen, lower alkyl, lower alkoxy, halogen, $NO_2$, CN or lower alkylsulfonyl, and
A is an anion.

In preferred dyes, the substituent $R_1$ is in the p-position with respect to the nitrogen bond.

As halogen, $R_1$ is for example the chlorine, bromine or fluorine atom; as a lower alkyl group, $R_1$ is a straight-chain or branched-chain alkyl group having 1 to 5 carbon atoms, for example the methyl, ethyl, n- and iso-propyl group, the n-, sec- or tert-butyl group, or the straight-chain or branched-chain pentyl group; and as a lower alkoxy group, $R_1$ is a group having 1 to 5 carbon atoms, such as the methoxy, ethoxy, propoxy, butoxy or pentoxy group. In preferred dyes, $R_1$ is hydrogen, Cl, or Br, or an alkyl or alkoxy group each having 1 to 4 carbon atoms, and especially hydrogen or chlorine.

As a lower alkyl group, $R_2$ is an alkyl group having 1 to 5 carbon atoms, for example the methyl, ethyl, n- and iso-propyl group, the n-, sec- or tert-butyl group, or the straight-chain or branched-chain pentyl group. These alkyl groups can be substituted for example by hydroxyl; by a lower alkoxy group having 1 to 5 carbon atoms, such as the methoxy, ethoxy or propoxy group; by halogen, such as fluorine, chlorine or bromine; by CN; by a carboxylic acid amide group which can be mono- or disubstituted on the N atom by alkyl groups; by a carboxylic acid alkyl ester group, where the alkyl moiety can have 1 to 4 carbon atoms, such as the —$COOCH_3$, —$COOC_2H_5$ and —$COOC_3H_7$ groups; and by phenyl. In addition, $R_2$ is an alkenyl group having 3 or 4 carbon atoms, such as the allyl group. In preferred dyes, $R_2$ is an unsubstituted alkyl group having 1 to 4 carbon atoms, especially the $CH_3$ group.

As a lower alkyl group, $R_3$ is a lower alkyl group having 1 to 5 carbon atoms, analogous to that of the symbol $R_1$. When both symbols $R_3$ together form a carbocyclic 5-, 6- or 7-membered ring, it is the tetra-, penta- or hexamethylene group.

In preferred dyes, the $R_3$'s are each the same alkyl group having 1 to 4 carbon atoms; in particular each are the methyl group.

As a lower alkyl group, $R_4$ is one having 1 to 5 carbon atoms, analogous to that of the symbol $R_1$; as an aryl group, $R_4$ is for example the phenyl or α- or β-naphthyl group, which aryl groups can be unsubstituted or can be substituted for example by halogen, such as fluorine, chlorine or bromine; by CN or by one or more alkyl or alkoxy groups each having 1 to 4 carbon atoms, such as the methyl, ethyl, propyl, methoxy, ethoxy or propoxy group. In preferred dyes, $R_4$ is an alkyl group having 1 to 4 carbon atoms, particularly the $CH_3$ group, or hydrogen, unsubstituted phenyl, or phenyl which is substituted by one or more alkyl groups, alkoxy groups or halogen.

As lower alkyl or lower alkoxy, $R_5$, $R_6$ and $R_7$ are groups each having 1 to 5 carbon atoms, analogous to those of the symbol $R_1$; as halogen, they are for example fluorine, chlorine or bromine, and as a lower alkylsulfonyl group, they are for example each the methylsulfonyl, ethylsulfonyl, propylsulfonyl, butylsulfonyl or pentylsulfonyl group.

In preferred dyes, $R_5$, $R_6$ and $R_7$ independently of one another are hydrogen or an alkyl or alkoxy group each having 1 or 2 carbon atoms, or halogen; in particular however, one substituent of $R_5$, $R_6$ and $R_7$ is an alkyl group or an alkoxy group each having 1 or 2 carbon atoms, and the two other substituents are hydrogen; especially, however, one substituent of $R_5$, $R_6$ and $R_7$ is an alkyl group having 1 or 2 carbon atoms, and the two other substituents are hydrogen, or one substituent of $R_5$, $R_6$ and $R_7$ is hydrogen, and the two other substituents are each an alkyl group or an alkoxy group each having 1 or 2 carbon atoms; but above all, one substituent of $R_5$, $R_6$ and $R_7$ is hydrogen, and the two other substituents are each an alkyl group having 1 or 2 carbon atoms.

As an anion, A denotes both organic and inorganic ions, for example the halide ion, such as the chloride, bromide or iodide ion, also the sulfate, methosulfate, aminosulfonate, perchlorate, carbonate, bicarbonate, phosphate, phosphomolybdic, phosphotungstic, phosphotungstomolybdic, benzenesulfonate, toluenesulfonate, 4-chlorobenzenesulfonate, naphthalenesulfonate, oxalate, maleinate, formiate, acetate, propionate, lactate, succinate, chloroacetate, tartrate, methanesulfonate, benzoate and rhodanide ions, or complex anions, such as that of chlorine-zinc double salts or tetrafluoroborate.

Particularly interesting dyes on account of their high brilliance and good fastness properties are the dyes of the formula Ia

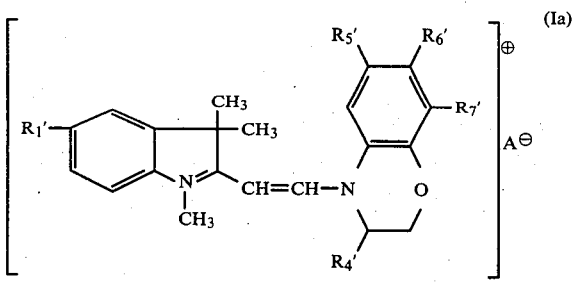

wherein
R$_1'$ is hydrogen, chlorine or methoxy,
R$_4'$ is hydrogen or an unsubstituted alkyl group having 1 to 4 carbon atoms, or a phenyl group which is unsubstituted or mono- or polysubstituted by chlorine, bromine, CN, alkyl (C$_1$–C$_4$) or alkoxy (C$_1$–C$_4$),
R$_5'$, R$_6'$ and R$_7'$ independently of one another are hydrogen, Cl, Br, alkyl (C$_1$–C$_4$) or alkoxy (C$_1$–C$_4$), and
A is an anion;
and in particular those wherein R$_1'$ is hydrogen, R$_4'$ is hydrogen, CH$_3$ or unsubstituted phenyl, and R$_5'$, R$_6'$ and R$_7'$ independently of one another are hydrogen, methyl or methoxy; and especially those wherein R$_4'$ is methyl or unsubstituted phenyl, R$_5'$ and R$_7'$ are each hydrogen and R$_6'$ is methyl.

The novel cationic dyes according to the invention are greenish-yellow dyes.

The novel cationic dyes of the formula I are used for dyeing and, with the addition of binders and solvents, for printing materials which are dyeable with cationic dyes, particularly textile materials consisting for example advantageously of homo- or copolymers of acrylonitrile; or synthetic polyamides or polyesters which are modified by acid groups. Furthermore, the novel cationic dyes are also used for dyeing wet tow, plastics materials, leather and paper. Dyeing is preferably performed from an aqueous, neutral or acid medium by the exhaust process, optionally under pressure, or by the continuous process. The textile material can be in the widest variety of forms, for example in the form of fibres, filaments, fabrics, knitwear, piece goods and finished articles, such as shirts and pullovers.

Finally, the novel dyes of the formula I can be used also in the transfer printing process.

There can be produced by application of the dyes according to the invention very deep, level, greenish-yellow dyes and printings which are characterised by very good general fastness properties, such as very good fastness to light, decatising, washing and perspiration.

Those dyes of the formula I which have good solubility in organic solvents, such as perchloroethylene, are also suitable for dyeing the textile materials mentioned, or for dyeing, for example, plastics materials, from organic media.

The novel cationic dyes of the formula I are produced for example by condensing an aldehyde of the formula II

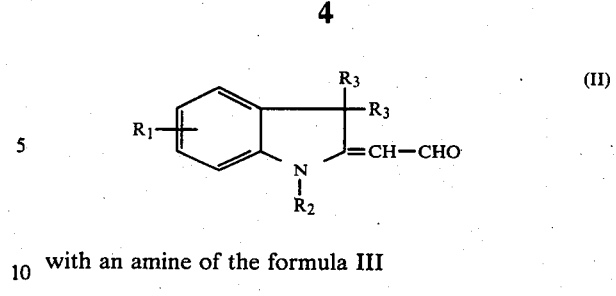

with an amine of the formula III

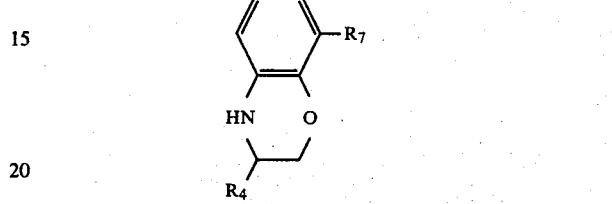

wherein the symbols R$_1$, R$_2$, R$_3$, R$_4$, R$_5$, R$_6$ and R$_7$ are as defined under the formula I, in the presence of an acid HA, in which A is the radical of an anion; or by condensing an aldehyde of the formula II with an amine of the formula III in an organic solvent in the presence of dehydrating agents.

The starting compound of the formula II is known, and some of the starting compounds of the formula III are known and can be produced by analog processes for the known benzomorpholines (for example Chem. Berichte Vol. 30, p. 1634 ff; Vol. 55, p. 3821; Chem. Zentralblatt, p. 525 (1898), and U.S. Pat. No. 2,448,869).

The compounds of the formula II are for example the following:

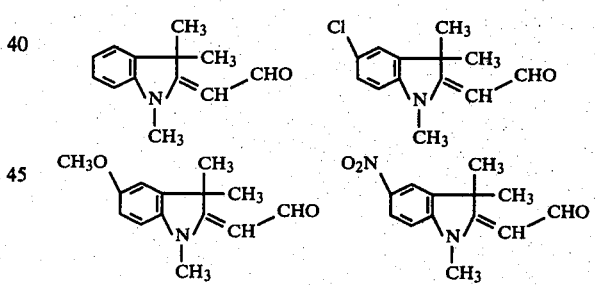

The following are listed as examples of compounds of the formula III:
benzomorpholine, 3-phenyl-benzomorpholine, 3,7-dimethyl-benzomorpholine, 3-phenyl-6-methyl-benzomorpholine,
7-methyl-benzomorpholine, 6-methyl-benzomorpholine,
8-methyl-benzomorpholine, 6-chloro-benzomorpholine,
6-methoxy-benzomorpholine, 7-chloro-benzomorpholine,
7-methoxy-benzomorpholine, 6,8-dimethyl-benzomorpholine,
6,7-dimethyl-benzomorpholine, 3-methyl-benzomorpholine,
3-ethyl-benzomorpholine, 3-ethyl-6-methyl-benzomorpholine, 3-propyl-benzomorpholine, 3-[p-methyl]-phenyl-benzomorpholine, 3-[p-chloro]-phenyl-7-methyl-benzomorpholine,
3-[p-methoxy]-phenyl-7-methyl-benzomorpholine,
3-[m.p-dimethyl]-phenyl-7-methyl-benzomorpholine, and
3-phenyl-7-methyl-benzomorpholine.

The condensation reaction of the aldehyde of the formula II with the amine of the formula III is performed in a known manner, for example in an aqueous medium at a temperature of about 0° to 100° C., in the presence of an acid HA. This acid is an organic acid, such as acetic acid or arylsulfonic acid, particularly benzenesulfonic acid; or it is an inorganic acid, such as hydrochloric acid, sulfuric acid or phosphoric acid.

If the reaction is performed in organic solvents with dehydrating agents, suitable solvents are aprotic organic solvents: for example aliphatic, optionally chlorinated, hydrocarbons such as cyclohexane, methylene chloride, chloroform or tetrachloroethylene; or aromatic, optionally chlorinated, hydrocarbons such as toluene, chlorobenzene or dichlorobenzene, as well as ketones and ethers; and suitable dehydrating agents are for example phosphorus oxychloride and thionyl chloride.

After the condensation reaction, the novel cationic dyes are separated from the reaction medium and dried. If it is desired or is necessary, it is possible to exchange in the dyes of the formula I the anion A for another anion.

In the following Examples, the term 'parts' denotes parts by weight, percentages are given as percent by weight, and the temperature values in degrees Centigrade.

EXAMPLE 1

10 parts of 1,3,3-trimethyl-2-methyleneindoline-ω-aldehyde and 6.7 parts of benzomorpholine are dissolved in 30 parts of methanol. There are then added 2.5 parts of formic acid, and the reaction solution is held at 40°–45° for 2 hours. The methanol is subsequently distilled off; the residue consisting of 18 g of crude product is afterwards dissolved in 100 parts of 1 N acetic acid at 50°, the solution is clarified and then cooled to room temperature. To the dye solution are added 10 parts of aqueous hydrochloric acid (30%) and 20 parts of sodium chloride, whereupon the dye salt of the formula

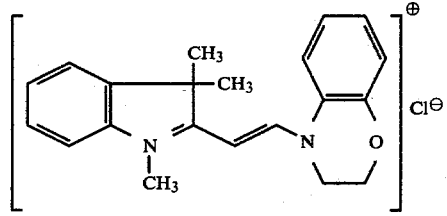

precipitates in crystalline form. This is filtered off and dried to yield 6.5 parts of a very pure cationic dye which produces on polyacrylonitrile materials pure greenish-yellow shades having a high degree of fastness to light.

EXAMPLE 2

6 parts of 1,3,3-trimethyl-2-methyleneindoline-ω-aldehyde and 6.3 parts of 3-phenyl-benzomorpholine are mixed with 30 parts of 1 N sulfuric acid, and held at 70°–75° for 4 hours. There are added 200 parts of 1 N acetic acid and 200 parts of toluene; the phases are then separated and, by the addition of 10 parts of sodium chloride to the aqueous phase, the dye salt of the formula

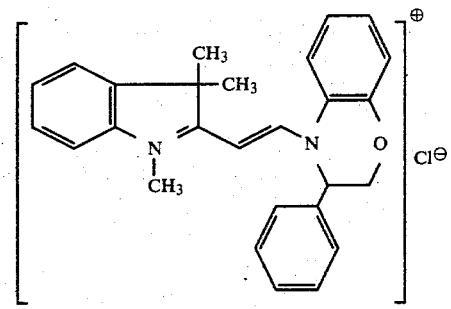

is precipitated in the form of a crystalline product. It is filtered off and dried in vacuo at 60° to obtain 6.3 parts of a yellow cationic dye which dyes polyacrylonitrile fibres in very pure greenish-yellow shades having excellent fastness properties.

If in the above Example the sulfuric acid is replaced by corresponding amounts of hydrochloric acid or phosphoric acid, an analogous cationic dye is obtained.

EXAMPLE 3

6 parts of 1,3,3-trimethyl-2-methyleneindoline-ω-aldehyde and 4.9 parts of 3,7-dimethyl-benzomorpholine are dissolved in 50 parts of chloroform. There are then added dropwise with stirring, within 5 minutes, 6 parts of phosphorus oxytrichloride, with the reaction temperature rising to 50°; the temperature is subsequently held at 60° for a further 2 hours, and 10 parts of a 40% aqueous sodium acetate solution and 50 parts of water are then added. The chloroform is afterwards distilled off, and the residue is dissolved in 10 parts of acetic acid and 250 parts of water at 70°. The dye solution is clarified by filtration and cooled. The dye salt of the formula

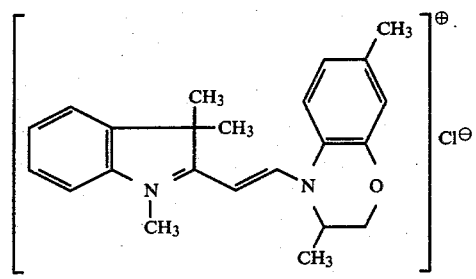

precipitates, and is filtered off and dried. The yield is 8.2 parts of the yellow cationic dye which is excellently suitable for dyeing polyacrylonitrile. If there are used, instead of phosphorus oxytrichloride, corresponding amounts of thionyl chloride, the same cationic dye having equally good properties is obtained.

By using, instead of 6 parts of 1,3,3-trimethyl-2-methyleneindoline-ω-aldehyde, equivalent parts of 1-ethyl-3,3-dimethyl-2-methyleneindoline-ω-aldehyde or of 1-benzyl-3,3-dimethyl-2-methyleneindoline-ω-aldehyde or of 1-allyl-3,3-dimethyl-2-methyleneindoline-ω-aldehyde, with otherwise the same procedure, there are obtained greenish-yellow dyes having equally good properties.

With an analogous procedure and with appropriate variation of the starting materials, there are obtained the cationic dyes which are listed in the following Table and which correspond to the formula

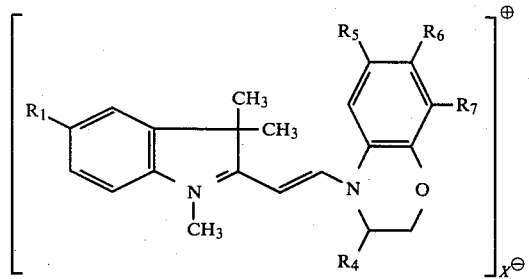

which dye polyacrylonitrile materials in greenish-yellow shades.

TABLE

| Example | $R_1$ | $R_4$ | $R_5$ | $R_6$ | $R_7$ | X |
|---|---|---|---|---|---|---|
| 4 | H | $C_6H_5$ | $CH_3$ | H | H | Cl |
| 5 | " | " | H | $CH_3$ | H | " |
| 6 | " | " | $CH_3$ | " | " | " |
| 7 | " | " | " | H | $CH_3$ | " |
| 8 | " | " | Cl | " | H | " |
| 9 | " | " | $OCH_3$ | " | " | " |
| 10 | " | " | H | Cl | " | " |
| 11 | " | " | " | $OCH_3$ | " | " |
| 12 | Cl | " | " | H | " | " |
| 13 | " | " | $CH_3$ | " | " | " |
| 14 | " | " | H | $CH_3$ | " | " |
| 15 | $CH_3O$ | " | " | H | " | " |
| 16 | H | H | $CH_3$ | " | " | " |
| 17 | " | " | H | $CH_3$ | " | " |
| 18 | " | " | $CH_3$ | " | " | " |
| 19 | " | $CH_3$ | H | H | " | " |
| 20 | " | " | $CH_3$ | " | " | " |
| 21 | " | " | " | " | $CH_3$ | " |
| 22 | " | " | " | $CH_3$ | H | " |
| 23 | " | " | Cl | H | " | " |
| 24 | " | " | H | Cl | " | " |
| 25 | " | " | $OCH_3$ | H | " | " |
| 26 | " | " | H | $OCH_3$ | " | " |
| 27 | Cl | " | " | H | " | " |
| 28 | " | " | $CH_3$ | " | " | " |
| 29 | " | " | H | $CH_3$ | " | " |
| 30 | H | $C_2H_5$ | " | H | " | " |
| 31 | H | $C_2H_5$ | $CH_3$ | H | H | Cl |
| 32 | " | " | H | $CH_3$ | " | " |
| 33 | " | $C_3H_7$ | " | H | " | " |
| 34 | " | " | $CH_3$ | " | " | " |
| 35 | " | " | H | $CH_3$ | " | " |
| 36 | " | " | " | H | " | " |
| 37 | " | $CH_3-\langle\rangle-$ | $CH_3$ | " | " | " |
| 38 | " | " | H | $CH_3$ | " | " |
| 39 | " | $Cl-\langle\rangle-$ | " | " | " | " |
| 40 | " | $CH_3O-\langle\rangle-$ | " | " | " | " |
| 41 | " | $CH_3-\langle\rangle-CH_3$ | " | " | " | " |
| 42 | " | $\langle\rangle-$ | " | " | " | $OCOCH_3$ |
| 43 | " | " | " | " | " | Br |
| 44 | " | " | " | " | " | $ZnCl_3$ |
| 45 | " | $CH_3$ | $C_4H_9(sec)$ | H | " | Cl |
| 46 | " | " | $C_4H_9(tert)$ | H | " | " |

EXAMPLE 47

5 g of the cationic dye produced according to Example 1 is stirred to a paste with 2 g of 40% acetic acid, and taken into solution by the addition of 4000 g of hot water. There are subsequently added 1 g of sodium acetate and 2 g of an addition product of 15 to 20 equivalents of ethylene oxide with N-octadecyldiethylenetriamine, which product has been quaternised with dimethylsulfate; and 100 g of polyacrylonitrile fabric is then introduced at 60°. The bath is heated within 30 minutes to 100°, and the material is dyed at boiling temperature for 90 minutes. The liquor is afterwards allowed to cool in the course of 30 minutes to 60°, and the dyed material is then removed, and finally rinsed with lukewarm water and with cold water.

A pure greenish-yellow polyacrylonitrile dyeing having fastness to light is obtained.

EXAMPLE 48

A polyacrylonitrile copolymer consisting of 93% of acrylonitrile and 7% of vinyl acetate is dissolved in dimethylacetamide to give a 15% solution. The spinning solution is then extruded into a spinning bath which is made up of 40% of dimethylacetamide and 60% of water. The resulting tow is subsequently drawn by known methods, and freed from dimethylacetamide by rinsing with hot and cold water.

This wet tow is dyed by immersion in an aqueous bath at 42° of the following composition:

9 g of dye according to Example 1 per liter, pH-value 4.5 with acetic acid.

The contact time 'tow/dye liquor' is 2 seconds. The excess dye liquor is subsequently squeezed out, and the tow is fed into the dryer. A tow dyed in a greenish-yellow shade and having good fastness properties is obtained.

What is claimed is:

1. A cationic dye of the formula I

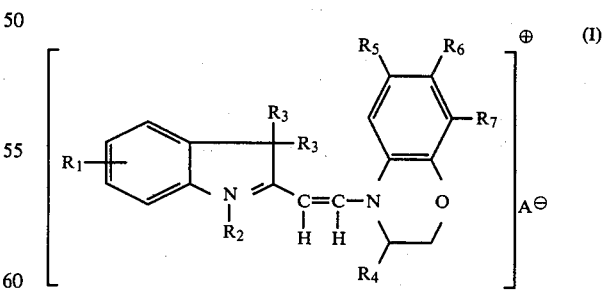

wherein $R_1$ is hydrogen, halogen, lower alkyl, lower alkoxy or $NO_2$,

. $R_2$ is unsubstituted lower alkyl, or lower alkyl which is substituted by: hydroxyl, lower alkoxy, halogen, CN, carboxylic acid amide, carboxylic acid alkyl ester or phenyl, or $R_2$ is alkenyl ($C_3$–$C_4$), the $R_3$'s independently of one another are each lower alkyl, or both $R_3$'s together form a carbocyclic 5-, 6- or 7-membered ring, $R_4$ is hydrogen, lower alkyl, unsubstituted aryl or substituted aryl, $R_5$, $R_6$ and $R_7$ independently of one another are hydrogen, lower alkyl, lower alkoxy, halogen, $NO_2$, CN or lower alkylsulfonyl, and A is an anion.

2. A cationic dye according to claim 1, wherein the substituent $R_1$ is in the p-position with respect to the nitrogen bond.

3. A cationic dye according to claims 1 or 2, wherein $R_1$ is hydrogen, Cl, Br or an alkyl or alkoxy group each having 1 to 4 C atoms.

4. A cationic dye according to claim 3, wherein $R_1$ is hydrogen or Cl.

5. A cationic dye according to claim 1, wherein $R_2$ is an unsubstituted alkyl group having 1 to 4 carbon atoms.

6. A cationic dye according to claim 5, wherein $R_2$ is the $CH_3$ group.

7. A cationic dye according to claim 1, wherein the $R_3$'s are each the same alkyl group having 1 to 4 carbon atoms.

8. A cationic dye according to claim 7, wherein the $R_3$'s are each the methyl group.

9. A cationic dye according to claim 1, wherein $R_4$ is an alkyl group having 1 to 4 carbon atoms.

10. A cationic dye according to claim 9, wherein $R_4$ is the $CH_3$ group.

11. A cationic dye according to claim 1, wherein $R_4$ is hydrogen, unsubstituted phenyl, or phenyl which is substituted by one or more alkyl groups or alkoxy groups or by halogen.

12. A cationic dye according to claim 1, wherein $R_5$, $R_6$ and $R_7$ independently of one another are hydrogen or an alkyl or alkoxy group each having 1 or 2 carbon atoms, or halogen.

13. A cationic dye according to claim 12, wherein one substituent of $R_5$, $R_6$ and $R_7$ is an alkyl group or an alkoxy group each having 1 or 2 carbon atoms, and the two other substituents are hydrogen.

14. A cationic dye according to claim 13, wherein one substituent of $R_5$, $R_6$ and $R_7$ is an alkyl group having 1 or 2 carbon atoms, and the two other substituents are hydrogen.

15. A cationic dye according to claim 12, wherein one substituent of $R_5$, $R_6$ and $R_7$ is hydrogen, and the two other substituents are each an alkyl group or an alkoxy group each having 1 or 2 carbon atoms.

16. A cationic dye according to claim 15, wherein one substituent of $R_5$, $R_6$ and $R_7$ is hydrogen, and the two other substituents are each an alkyl group having 1 or 2 carbon atoms.

17. A cationic dye according to claim 1 of the formula Ia

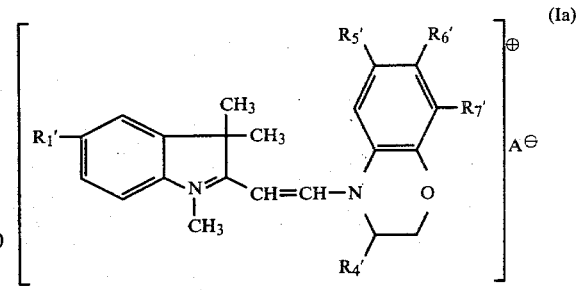

wherein
$R_1'$ is hydrogen, chlorine or methoxy,
$R_4'$ is hydrogen or an unsubstituted alkyl group having 1 to 4 carbon atoms, or a phenyl group which is unsubstituted or mono- or polysubstituted by chlorine, bromine, CN, alkyl ($C_1$-$C_4$) or alkoxy ($C_1$-$C_4$),
$R_5'$, $R_6'$ and $R_7'$ independently of one another are hydrogen Cl, Br, alkyl ($C_1$-$C_4$) or alkoxy ($C_1$-$C_4$), and
A is an anion.

18. A cationic dye according to claim 17, wherein $R_1'$ is hydrogen.

19. A cationic dye according to claims 17 and 18, wherein $R_4'$ is hydrogen, $CH_3$ or unsubstituted phenyl, and $R_5'$, $R_6'$ and $R_7'$ independently of one another are hydrogen, methyl or methoxy.

20. A cationic dye according to claim 19, wherein $R_4'$ is methyl or unsubstituted phenyl, $R_5'$ and $R_7'$ are each hydrogen, and $R_6'$ is methyl.

21. A cationic dye according to claim 1 of the formula

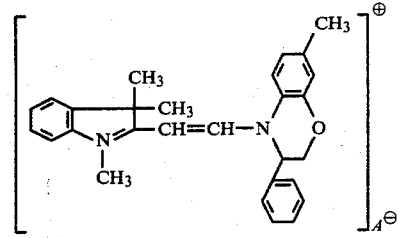

wherein A is an anion, particularly the chlorine ion.

22. A cationic dye according to claim 1 of the formula

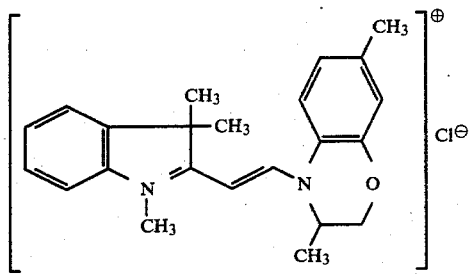

23. A cationic dye according to claim 1 of the formula

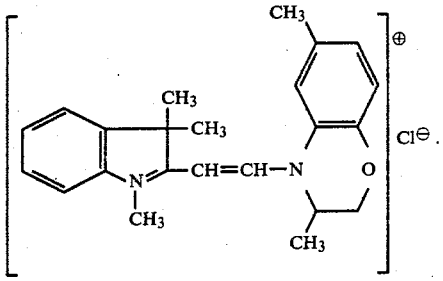

* * * * *